(12) United States Patent
Thun-Hohenstein et al.

(10) Patent No.: US 11,525,937 B2
(45) Date of Patent: Dec. 13, 2022

(54) REGISTRATION SYSTEM

(71) Applicant: IRIS-GMBH INFRARED & INTELLIGENT SENSORS, Berlin (DE)

(72) Inventors: Andreas Thun-Hohenstein, Berlin (DE); Thomas Noack, Berlin (DE); Axel Reimann, Panketal (DE); Stefan Haun, Magdeburg (DE); Paul Haufe, Berlin (DE)

(73) Assignee: IRIS-GMBH INFRARED & INTELLIGENT SENSORS, Berlin (DE)

( * ) Notice: Subject to any disclaimer, the term of this patent is extended or adjusted under 35 U.S.C. 154(b) by 0 days.

(21) Appl. No.: 16/763,703

(22) PCT Filed: Nov. 13, 2018

(86) PCT No.: PCT/EP2018/081096
§ 371 (c)(1),
(2) Date: May 13, 2020

(87) PCT Pub. No.: WO2019/092277
PCT Pub. Date: May 16, 2019

(65) Prior Publication Data
US 2020/0301038 A1    Sep. 24, 2020

(30) Foreign Application Priority Data

Nov. 13, 2017    (DE) .......................... 102017126553.8

(51) Int. Cl.
*G01V 3/12*    (2006.01)
*G07C 9/00*    (2020.01)
(Continued)

(52) U.S. Cl.
CPC .............. *G01V 3/12* (2013.01); *G06F 16/285* (2019.01); *G06V 40/103* (2022.01)

(58) Field of Classification Search
CPC .... G01V 3/12; G06F 16/285; G06K 9/00369; G06K 9/00832; G06K 9/00791;
(Continued)

(56) References Cited

U.S. PATENT DOCUMENTS

| | | | |
|---|---|---|---|
| 5,305,390 A * | 4/1994 | Frey ....................... | G06Q 10/06 382/115 |
| 6,919,804 B1 * | 7/2005 | Cook ....................... | G07C 9/00 340/541 |

(Continued)

FOREIGN PATENT DOCUMENTS

| | | |
|---|---|---|
| DE | 10341426 A1 | 4/2005 |
| DE | 102009046628 A1 | 5/2011 |

(Continued)

OTHER PUBLICATIONS

Tanner et al., People Detection and Tracking with TOF Sensor, AVSS 2008, Sep. 1-3, 2008, pp. 356-561, IEEE Fifth International Conference on Advanced Video and Signal Based Surveillance.

(Continued)

*Primary Examiner* — Jeffrey P Aiello
(74) *Attorney, Agent, or Firm* — Ware, Fressola, Maguire & Barber LLP (57) ABSTRACT

A registration system for classifying an object, comprising a sensor unit, an evaluation unit, a memory unit and a data-processing unit. The evaluation unit determines a structure data set or a temporal sequence of structure data sets of the object to be registered from a temporal progression of the radiation captured by the sensor assembly. The memory unit stores association rules, each associated with a set of situation parameters. The data-processing unit accesses the (Continued)

structure data set or a temporal sequence of structure data sets, the current situation parameter set, and the association rule associated with the current parameter set and to associate an object with an object class on the basis of the structure data set associated with the object or a temporal sequence of structure data sets by using an association rule associated with the current situation parameter set and received from the memory unit.

16 Claims, 6 Drawing Sheets

(51) Int. Cl.
  *G06F 16/28* (2019.01)
  *G06V 40/10* (2022.01)
(58) Field of Classification Search
  CPC .......... G07C 9/00; G07C 5/008; G06N 20/00; G06N 3/0454; G06N 3/08; G06T 2207/20084
  USPC ...... 340/541, 545.3, 556; 382/224; 702/127, 702/150, 189
  See application file for complete search history.

(56) References Cited

U.S. PATENT DOCUMENTS

| | | | | |
|---|---|---|---|---|
| 9,235,934 B2* | 1/2016 | Mandella | ............ | G06F 3/04815 |
| 9,495,652 B1* | 11/2016 | Cook | ................ | G06Q 30/0201 |
| 2004/0022439 A1* | 2/2004 | Beardsley | .......... | G06K 9/00201 |
| | | | | 382/224 |
| 2008/0106599 A1* | 5/2008 | Liu | ...................... | G06K 9/3241 |
| | | | | 348/143 |
| 2010/0185064 A1* | 7/2010 | Bandic | .................. | A61B 5/415 |
| | | | | 600/306 |
| 2011/0301441 A1* | 12/2011 | Bandic | ................ | A61B 5/4875 |
| | | | | 600/306 |
| 2012/0081545 A1* | 4/2012 | Jin | ....................... | G01B 11/022 |
| | | | | 348/141 |
| 2012/0321759 A1* | 12/2012 | Marinkovich | .......... | G01J 3/508 |
| | | | | 426/231 |
| 2018/0039745 A1* | 2/2018 | Chevalier | ............. | G16H 10/60 |

FOREIGN PATENT DOCUMENTS

| | | | |
|---|---|---|---|
| DE | 102015202232 A1 * | 9/2015 | |
| DE | 102015202232 A1 | 8/2016 | |
| DE | 102015202233 A1 | 8/2016 | |
| EP | 0561071 A2 * | 3/1992 | |
| EP | 0561071 A2 | 9/1993 | |
| EP | 1224632 B1 | 12/2009 | |

OTHER PUBLICATIONS

German Office Action dated Oct. 30, 2018 from corresponding Application No. 10 2017 126 553.8, 6 pages.
PCT International Preliminary Report on Patentability dated May 19, 2020 from corresponding Application No. PCT/EP2018/081096, 7 pages.
PCT International Search Report and Written Opinion dated Feb. 22, 2019 from corresponding Application No. PCT/EP2018/081096 with English translation, 11 pages.

* cited by examiner

REGISTRATION SYSTEM

CROSS REFERENCE TO RELATED APPLICATIONS

This application is the U.S. National Stage of PCT/EP2018/081096 filed on Nov. 13, 2018, which application claims priority under 35 USC § 119 to German Patent Application No. 10 2017 126 553.8 filed on Nov. 13, 2017. Both of these applications are hereby incorporated by reference in their entirety.

Technical Field

The invention relates to a registration system for classifying an object. Furthermore, the invention relates to an authorization check system and a method of operating a registration system.

Background of the Invention

Systems for data collection in public transport are known from prior art; these systems are for example configured to recognize valid tickets and to output a corresponding signal. Furthermore, sensor assemblies for capturing an object structure, for example in the context of facial recognition, are also known.

EP 1224632 B1 describes a registration device for capturing persons or objects and their direction of movement comprising a sensor arrangement for capturing electromagnetic radiation with the wavelength of visible and/or invisible light, which is reflected by or emanates from a person or an object. Furthermore, the registration device comprises an evaluation unit that is connected to the sensor arrangement and is configured to derive a signal from the radiation registered by the radiation sensor arrangement and, if possible, to emit a registration signal for each object or person registered by the radiation sensor arrangement.

SUMMARY OF THE INVENTION

It is the object of the present invention to provide an improved registration system for classifying an object.

In order to achieve this object, according to a first aspect of the invention, a registration system for classifying an object is proposed, said system comprising a sensor unit, an evaluation unit, a memory unit and a data-processing unit as well as an analysis unit.

The sensor unit comprises a radiation source for emitting electromagnetic radiation and a sensor assembly that is configured to register a radiation emanating from—for example by being reflected—an object in the registration range of the sensor unit.

The evaluation unit is connected to the sensor unit and configured to determine a temporal sequence of structure data sets of the currently registered object from the radiation registered by the sensor assembly. A structure data set comprises data that characterizes a structure of the currently registered object. Preferably, such a structure data set will reflect three-dimensional images. The sensor unit preferably works according to the Time-of-Flight (ToF) principle, in order to capture three-dimensional images. A corresponding three-dimensional image is represented by a point cloud, in which each point represents a distance between sensor unit and object in—from the point of view of the sensor unit—different directions. Accordingly, a structure data set may have the form of a matrix or of an ordered sequence of values, that represent the respective point cloud. In each case, a point cloud represents a snapshot, i.e. the point cloud recorded by the sensor unit changes over time, e.g. when the registered object moves.

The memory unit is configured to store a number of association rules, each of which is associated with a situation parameter from a set of predetermined situation parameters. In this context, a situation parameter is a value or a plurality of values that characterizes a currently present situation, preferably a local or temporal state of the registration system. The association rule associated with the situation parameter indicates how an object class is associated with the registered object based on the predetermined structure data set. In this context, "association rule" is a superordinate term for any association procedure.

The data-processing unit is connected to the memory unit and configured to access the structure data set and a current situation parameter as well as an association rule associated with the current situation parameter set in the memory unit and to associate the object with an object class on the basis of the structure data set by using an association rule associated with the current situation parameter. The object class is selected from a group of object classes which allow at least the distinction of whether the object is a person or not. Furthermore, the data-processing unit is preferably configured to output counter information that indicates the presence of an object of the determined object class.

Thus, the data-processing unit registers objects that reflect radiation, wherein the reflected radiation respectively provides a structure data set that represents the respective object. On the basis of the respective structure data set and through the use of the association rules, the respective object is associated with an object class so that the data-processing unit registers numerous objects of a respective object class over time—e.g. the opening time of the doors of a vehicle. Since the association rules are situation-dependent, they can reflect more precise occurrence probabilities for the objects of the different object class—e.g. adults, children, bicycles, strollers, wheelchairs etc.—and accordingly contain more precise association probabilities. This allows a more precise and more accurate association of the registered objects with object classes and thus e.g. a more precise passenger or object count.

The invention is based on the finding that the registration of rare objects, such as bicycles or wheelchairs inside a means of public transport requires a particularly high precision of the registration device, in order to ensure that the low probability of occurrence of such objects does not lie within the error rate of the registration device. In order to implement a particularly precise determination of the object class, the invention proposes an association rule that is adapted to situation parameters and thus takes the particularities of a current situation of the registration system into account.

Thus, the respective situation registered by the registration system, such as the location or point in time of the registration, can be used for the determination of the object class of the object. This is particularly advantageous due to the fact that typical objects to be registered occur and are registered by the sensor unit of the registration system at certain times or at certain locations with different probabilities. Thus, in the summer, significantly more cyclists with a bicycle will be the object to be registered using a train than in the winter, and strollers are registered on a bus significantly more frequently at lunch time than during the night. In those two examples, the season and the time of day are the respective current situation parameters of the registration system. Thus, instead of using a total probability for the determination of a certain object to be registered, it is advantageous to use a probability for the association rule which depends on the situation, for example the time and/or location. Such a conditional probability indicates the probability of the occurrence of a certain object to be registered depending on a respective situation represented by the situation parameter.

The situation parameter characterizes a current situation of the registration system, such as: the current bus stop of a bus in which the sensor unit is arranged; a current time; a current season; a current day of the week; a piece of entrance information that characterizes the entrance at which the sensor unit is currently arranged, such as a wheelchair friendly entrance or the entrance to a bicycle compartment; a bus number of the bus in which the sensor unit is currently being used; a currently occurring one-sided lowering of the bus in which the sensor is arranged on the entry side of the bus. The situation parameter may comprise a value or plurality of values. Thus, the situation parameter may be a vector that is composed of a plurality of values characterizing the current situation of the registration system.

The association rule typically depends on the respective situation that is reflected by the situation parameter. The association rule may for example contain association probabilities for persons or objects, through which the association of a respectively registered person or a respectively registered object with one of the object classes is taken into account. Such a classification of persons and objects that takes into account the probability of an occurrence of an object or a person is generally known. The fact that, due to the respective association with a situation parameter, the association rules are defined differently for different situations makes it, in particular, possible to take into account different occurrence probabilities of the individual objects that are potentially to be registered for different situations.

A group of object classes contains several object classes, for example two object classes. A respective object class is configured such that it indicates at least whether the object to be registered is a person, or whether it is a differently structured body, such as a bicycle, a wheelchair or a stroller. The group of object classes may, for example, comprise two object classes, namely a first object class for persons and a second object class for non-persons. A selection of potential object classes is described by means of different embodiments below, wherein the object class will always at least allow the conclusion whether the object to be registered is a person or not. The object classes from the group of object classes are typically predefined in such a way that no object belongs to two object classes.

The counter information typically indicates an increase in the number of counted objects of the determined object class by 1.

Embodiments of the registration system according to the invention are described below.

In a particularly preferred embodiment, the registration system has an analysis unit that is connected to the data-processing unit and the memory unit. The analysis unit is configured to access the current situation parameter and the counter information and to trigger an adaptation of the association rule associated with the situation parameter in the memory unit depending on the current situation parameter and the counter information. The respective current counter information for a respective situation represented by the situation parameter may, for example, show that the association rule and/or the occurrence probability of an individual object to be registered which the association rule is based upon is not current. This can be registered by the analysis unit. Subsequently, the analysis unit can adapt the association rules to the current circumstances, for example by adapting the occurrence probabilities that the association rules are based upon, so that, for a future registration of an object, the respective association rules are adapted even more precisely to the actual circumstances.

An adaptation of an association rule may e.g. consist in that the estimated occurrence probability that the respective association rule is based upon or also the classification method itself or both are changed and thus adapted to the current circumstances.

A particularly advantageous aspect of the registration system according to this embodiment is that the data-processing unit, the memory unit and the analysis unit are connected to each other in such a way that an association rule is adapted in accordance with the currently determined object class and that the adapted association rule is available via the memory unit for the determination of future object classes by the data-processing unit. Thus, the analysis unit triggers a learning process of the registration system after each classification of an object, so that, in the future, the registration system can classify objects to be classified even more precisely. Preferably, at a beginning of an operation of the registration system, the association rules are provided as initial association rules that reflect object probabilities based on empirical values, which are independent of the situation parameters. Proceeding on the basis of such an initial situation, the association rules are, depending on the respectively present parameter, adapted to the probability of the registration of an object of the determined object class that is actually present at said situation parameter, such as a bus stop.

The association rule is preferably adapted by means of a deterministic method. Through the deterministic method, a new association rule is explicitly determined from an originally present association rule on the basis of the counter information and the situation parameters, wherein said new association rule can be retrieved by the data-processing unit or is transmitted to it.

In one embodiment, a new association rule is determined implicitly via an adaptive method, e.g. a neural network. This embodiment is an alternative to a deterministically determined association rule. In this embodiment, the structure data set and the situation parameter are preferably used as input into the neural network, and the output is the association with an object class. This can be achieved through the analysis of an existing conditional probability with a stochastic component. The use of neural networks for learning and adaptation processes is generally known, so that no further description will be provided in this regard.

In one embodiment, the memory unit and the analysis unit in a registration system according to the invention are present without any spatial separation in a single module.

In an alternative embodiment, the memory unit and/or the data-processing unit and/or the analysis unit are preferably spatially separated from the sensor unit and the evaluation unit. A connection can be realized as a wireless connection. Thus, the evaluation unit with the sensor unit can also be arranged at a non-stationary location, such as in a means of public transport, while, for example, the analysis unit, the memory unit and the data-processing unit can be stationary.

In another alternative embodiment, the sensor unit, the evaluation unit and the data-processing unit are connected to the memory unit and the analysis unit via a wireless connection. This allows for a wireless connection of several data-processing units that access a central analysis unit and/or memory unit.

If the data-processing unit is arranged centrally and connected to several evaluation units via wireless connections, it will be advantageous for a respective evaluation unit to be configured to transmit the structure data sets with an identifier characterizing the evaluation unit, the sensor unit or e.g. the vehicle in which both are integrated to the data-processing unit, so that the data-processing unit will be able to associate the respective counter information with a corresponding evaluation unit or a corresponding vehicle, in order to individually determine the counter information for a respective evaluation unit. The data-processing unit is preferably configured to transmit the respective counter information back to a respective associated evaluation unit.

With regard to the wireless transmission of the structure data sets—e.g. two- or three-dimensional images captured by the sensor unit—necessary in this case, it is advantageous if the structure data sets—i.e. for example three-dimensional image data—are compressed.

The goal of the compression is to reduce the amount of data to be stored or transmitted by removing redundant and irrelevant data by means of a more efficient encoding of the available information. In case of the representation of 3D-images, redundancy is created through the specification of the data model, e.g. the representation of a 12-bit data space by means of 16-bit data words, and repetitions, e.g. due to non-changing backgrounds in a sequence of images. Non-relevant information arises from over-complex representation, e.g. too high a resolution in partial areas of the image, implicit instantiation of underlying models, e.g. the representation of a circle as a point cloud instead of as a center and diameter, and noise that is introduced into the data during the recording and processing process, e.g. due to the physical effects during the recording or numerical effects during image processing. The definition of relevance, i.e. the question which information is relevant and which information is not relevant, must be clarified with regard to the recipient of the information. As far as image recordings are concerned, human vision is, as a general rule, used as a standard in this regard and the compression methods are optimized for human physiology. In the processing of the 3D image data for the counting of persons, the suitability of the images for humans is of secondary importance. In that case, the relevance of the information for image processing is assessed. Models such as an estimation of the background, knowledge of the noise behavior and shapes and paths of recognized and tracked objects can be included in this context. Especially pre-processing steps influence the compression. All processing steps that cannot be executed prior to compression are recipients of the compressed data. For the wireless transmission of the structure data sets, compression will therefore be optimized with regard to these steps. In order to still allow evaluation by a viewer (referencing), individual images are, by means of a hybrid approach, enriched by the information necessary for the understanding of the human viewer. The decision of which image is enriched may be static, i.e. for example each image, as the case may be, with images in between being skipped, or may be performed dynamically during the compression with knowledge of the content. As a result, the system is able to use the data channel optimally for the transmission of three-dimensional images for counting persons and to allow, at the same time, manual referencing by a user.

If the data-processing unit, the memory unit and the analysis unit are provided centrally so that they can be accessed by the evaluation units of different vehicles, the vehicles can learn from one another, so to speak.

Even if the sensor unit, the evaluation unit, the data-processing unit and the memory unit are arranged in a respective vehicle—and therefore in a decentralized manner—the data-processing unit and memory unit may still be configured to exchange data with other data-processing units and memory units in other vehicles, in order to thus respectively exchange current data and/or association rules, whenever possible. However, preferably, at least the sensor unit and the evaluation unit as well as possibly also the data-processing unit and the memory unit are provided locally—i.e. for example in a respective vehicle—while at least the analysis unit and possibly also the data-processing unit and memory unit are preferably provided centrally.

In a preferred embodiment, the registration system comprises at least one additional data-processing unit. In that case, the memory unit and/or the analysis unit are configured such that they also have a wireless connection to the at least one additional data-processing unit of the registration system. Preferably, the at least one additional data-processing unit is arranged in a spatially separate manner from the data-processing unit of the registration system. The registration system may, for example, be used in public transport for determining object classes of objects to be determined, wherein each data-processing unit of the registration system is associated with one means of public transport. The advantage of using an additional data-processing unit is that a larger number of counter information is received, so that frequently occurring situation parameters can be associated with a particularly precise association rule. In the versions of this embodiment, the wireless connection is a connection from a GSM, WLAN, UMTS, DECT, LTE or NGMN network.

In an alternative embodiment, the analysis unit and/or the memory unit are connected to the data-processing unit via a wired connection. This makes it possible to transmit the association rule and/or other data of the registration system in a particularly secure and reliable manner.

In a particularly preferred embodiment, the group of object classes comprises several object classes, namely at least a combination of the object classes of adult, child, pet, bicycle, stroller, wheelchair, suitcase or walking aid. The registration system according to this embodiment is particularly advantageous, since some of the specified object classes are object classes that can be associated with an object in particularly rare cases. Since it is typically not possible to associate an object with a respective object class clearly and correctly, it is—especially for such rare objects—advantageous to facilitate higher precision of object recognition. The determination of the objects in accordance with the object classes of said embodiment can be used in an advantageous manner to adapt the location where the sensor unit is arranged, for example in means of public transport, to a potentially increased use by bicycles, wheelchairs or the like. Furthermore, the registration system according to this exemplary embodiment can be used as a basis of an automated ticket system for bicycles, strollers or the like, by means of which bicycles, strollers or the like are recognized automatically.

In a particularly preferred embodiment, all situation parameters are values that characterize e.g. a current day of the week, a current season, a current time, current weather data, holidays, vacation, use of boarding ramps, a current location of the sensor unit, a current stop of a means of transport equipped with the registration system, a one-sided lowering of the means of transport and/or entry information.

Entry information indicates whether for example a wheelchair-friendly entrance or an entrance to a bicycle compartment has been used. The selection of the situation parameters in this embodiment leads to an advantageous association of situation parameters and association rules. Thus, on a summer day, for example, more bicycles must be expected to be on a means of public transport than on a winter day, and in the proximity of an educational institution, the number of bicycles to be expected is higher than in an industrial area. Such correlations can, in the form of conditional probabilities, lead to a more precise association rule. Instead of using an overall probability P(OC) for the determination of a specific object class OC, the registrations system according to the invention uses the conditional probability P(OC|SP) for the determination of a specific object class OC when the situation parameter SP is present for the association rule. Consequently, the association rules may be advantageous for an evaluation of the correlation between objects to be registered and the situation parameters, i.e. it is, for example, possible to determine the probability of a bicycle being brought on board a means of public transport at a specific stop. In one version of this exemplary embodiment, several situation parameters are chosen from the group. In case of several situation parameters, the conditional probability (P(OC|SP1 & SP2) of the presence of a specific object class OC is subject to the condition that both the situation parameters SP1 and SP2 are present. As far as a formula is concerned, this conditional probability is obtained through the multiplication of the respective conditional probabilities P(OC|SP1) and P(OC|SP2) of the presence of an individual situation parameter, if the two situation parameters SP1 and SP2 are not correlated. This makes it possible to determine and apply a combined association rule for the registration of an object in case of the presence of both situation parameters on the basis of the two association rules associated with the situation parameters SP1 and SP2.

In another embodiment, the data processing unit is further configured to receive the current situation parameter from an external device. In this embodiment, the registration system has preferably a receiving unit that is configured to receive a situation signal indicating the current situation parameter from the external device. In one version of this embodiment, the external device is connected to the data processing unit via a plug connection. In an alternative version of this exemplary embodiment, the external device is connected to the data-processing unit via a wireless connection, for example via an exchange of an NFC, ZigBee WLAN or Bluetooth signal.

In an alternative embodiment to the previous embodiment, the registration system further comprises a localization unit that is configured to generate location information indicating the current location of the sensor unit, to determine a situation parameter based on this information and to output said situation parameter to the data-processing unit. The localization unit may, for example, be a GPS device.

In a preferred embodiment, the structure data set for a respective point in time represents a point cloud, wherein, in turn, said point cloud reflects a geometric structure of the respective captured object. This is, for example, achieved through the output of a number of point coordinates of the geometric structure. The point coordinates indicate a position of surface points of the captured geometric structure relative to each other. The display of a geometric structure makes it possible to distinguish particularly reliably between a person and an inanimate object, such as a bicycle or a stroller. Furthermore, two- or three-dimensional dimensions of the object to be registered can be captured, in order to display the geometric structure.

Preferably, the data processing unit is configured to evaluate successive structure data sets over time such that the data-processing unit is able to capture and to track the movement of one or several objects represented by the structure data sets. This makes it possible for the registration system in the preferred version of the embodiment to be configured to register when persons or objects in the registration range of the sensor unit turn around and/or to only generate counter information if an object or a person actually passes through the detection range. In other versions of the embodiment, the registration unit may in addition be configured to count objects and persons that are in the detection range of the sensor unit at a respective point in time. If the detection range of the sensor unit is an area in front of or behind a door, the latter version can be used to detect whether or not the door area is clear and if the door can be closed safely.

In one embodiment, the structure data set represents a three-dimensional matrix. This embodiment allows a particularly simple integration of known sensor units and evaluation units into the registration system according to the invention. Evaluation units, the output structure data set of which represents a three-dimensional matrix are generally known so that a detailed description of the possible realization of such evaluation units will not be provided below.

In a preferred embodiment, the determination of the structure data set is performed via a Time-of-Flight sensor. The evaluation unit will typically transmit more than 1,000 pixels per timestep, preferably more than 10,000 pixels per timestep.

In another embodiment, the data processing unit is further configured to output the counter information to a user interface, so that the presence of an object of the determined object class is shown to a user of the registration system. The registration system according to this embodiment provides the advantage that the determined object class can be controlled by a user. This leads to the advantage that the error rate of the registration system can be estimated. Moreover, the user interface allows for a central evaluation of all objects that were registered by the evaluation unit within a certain period of time. Preferably, the user interface allows for a statistical survey of the presence of objects of a certain object class within a certain period of time.

In one embodiment, the registration system is configured to be arranged in a means of transport, wherein the objects to be registered are transported by the means of transport. Preferably, the means of transport is a means of public transport. In a particularly preferred version of this exemplary embodiment, the registration system has, in addition to the data-processing unit, at least one additional data-processing unit, wherein the additional data-processing unit is arranged in another means of transport. Preferably, the registration system of this exemplary embodiment has an analysis unit, a memory unit, a plurality of sensor units, a plurality of evaluation units and a plurality of data-processing units, wherein a sensor unit, an evaluation unit and a data-processing unit are respectively arranged in each means of transport of a plurality of means of transport. A registration system arranged in the above described manner makes it possible to determine the presence of rare objects, such as bicycles and strollers, in the plurality of means of transport with a particularly low error rate and therefore particularly precisely. Such a registration system can serve as the basis for a payment system in the plurality of means of transport.

Furthermore, the registration system can control the presence of objects with a predetermined object class.

In other versions, the registration system is configured to be arranged in a building or a platform e.g. in doorways or access areas.

According to a second aspect of the invention, an authorization check system is proposed for the achievement of the above mentioned object.

The authorization check system comprises a registration system according to the first aspect of the invention and a user input unit that is configured to receive authorization information from a user of the authorization check system. Furthermore, in this case, the registration system is configured to determine on the basis of a comparison between the received authorization information and the determined object class whether or not an authorization is available for an object of the determined object class, and to trigger a warning signal if no authorization is available.

The authorization check system according to the second aspect of the invention advantageously allows for an automated authorization check. This is, in particular, advantageous if different object types, such as person and bicycle, must have different authorizations.

Furthermore, authorization information means a data set that indicates that a certain object or a certain object type has an authorization. In embodiments of the authorization check system, the data set is a data set that is automatically output by a device arranged at the object. In another embodiment, the data set is created through a key sequence entered by a user at the user input unit.

In one embodiment of the authorization check system according to the invention, the warning signal is formed by a visual signal, an acoustic signal or by an electronic signal output by an external device.

According to a third aspect of the invention, a method of operating a registration system is proposed for the achievement of the object mentioned above.

The method comprises the following steps:
storing a number of association rules, each of which is associated with a situation parameter from a set of predetermined situation parameters;
emitting electromagnetic radiation;
capturing radiation emanating from an object;
determining a structure data set from a temporal progression of the captured radiation;
accessing the structure data set and a current situation parameter as well as the association rule associated with the current situation parameter, and determining an object class from the structure data set on the basis of the association rule associated with the current situation parameter, wherein the object class is selected from a group of object classes that allows at least the distinction of whether the object is a person or not;
outputting counter information that indicates the presence of an object of the determined object class.

The method according to the second aspect of the invention allows for a situation-dependent determination of the present object class, which increases the accuracy of the registration system operated by means of the method.

In a particularly preferred embodiment, the method according to the invention further comprises the step of adapting the stored association rule associated with the situation parameter depending on the counter information and the current situation parameter. This embodiment of the method according to the third aspect of the invention allows for an automated adaptation of the association rule in accordance with the object classes determined in the past. This makes it, for example, possible to determine a correlation between the presence of certain objects and the presence of a certain situation parameter on the basis of the previously determined object classes.

In another embodiment, the steps of storing the number of association rules and of adapting the stored association rule are performed spatially separately from the other steps of the method, wherein the association rule associated with the current situation parameter is transmitted wirelessly for the determination of the object class.

BRIEF DESCRIPTION OF THE DRAWINGS

In the following, the invention shall be explained in more detail based on exemplary embodiments with reference to figures. Said figures show the following.

DETAILED DESCRIPTION

Figure 1A:
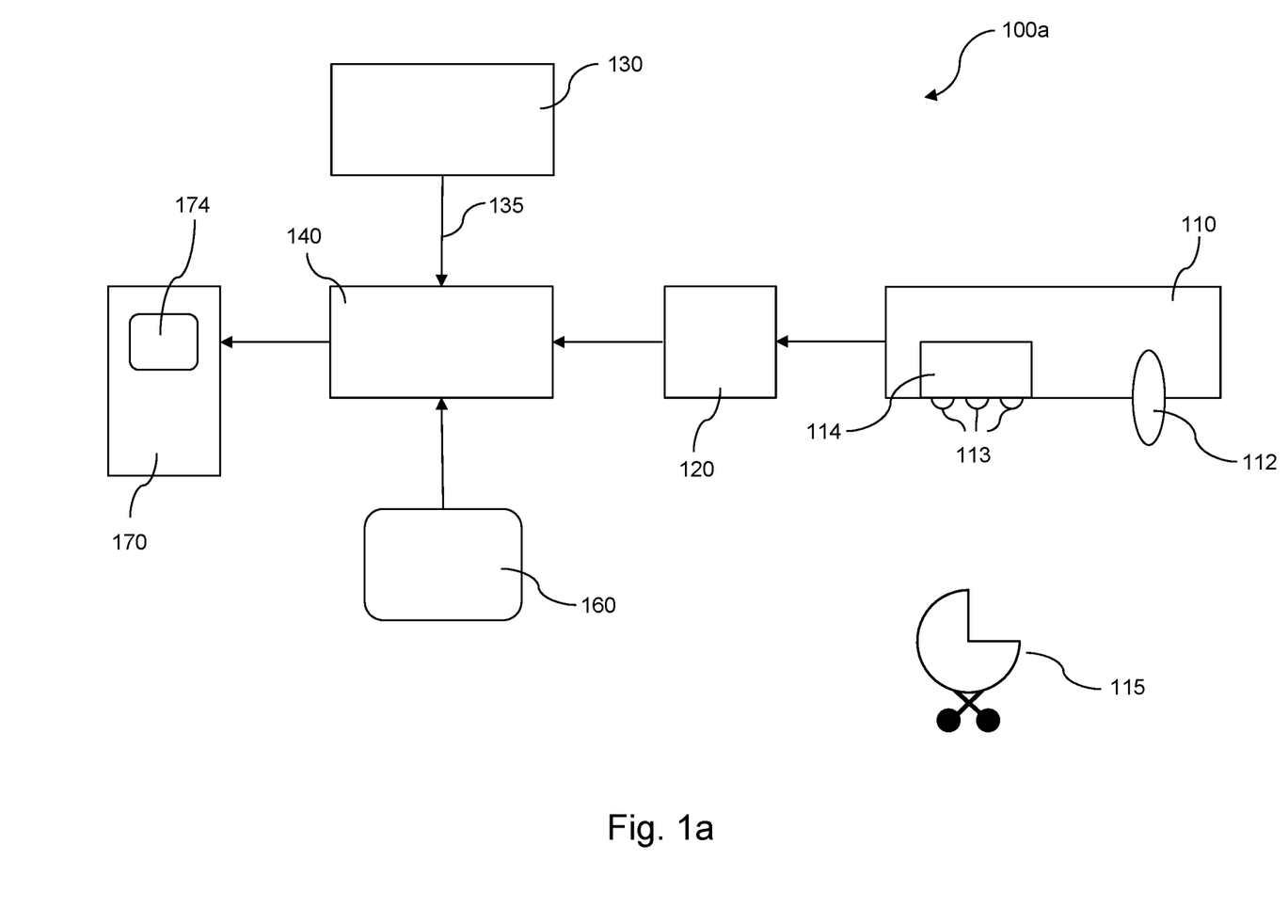
FIG. 1a, b a first exemplary embodiment (FIG. 1a) and a second exemplary embodiment (FIG. 1b) of a registration system according to a first aspect of the invention.

FIG. 1a shows a first exemplary embodiment of a registration system 100a according to a first aspect of the invention.

The registration system 100a has a sensor unit 110, an evaluation unit 120, a memory unit 130 and a data-processing unit 140.

The sensor unit 110 comprises a radiation source 112 for emitting electromagnetic radiation, and a sensor assembly 114, that is configured to capture radiation reflected by the object 115. The object 115 to be registered in the exemplary embodiment in FIG. 1 is, by way of example, a stroller. In the present exemplary embodiment, the sensor unit is a Time-of-Flight (ToF) sensor, that registers the time that the radiation emanating from the object required to travel from the radiation source 112 to the object 115 and back. Thus, the temporal progression of the captured electromagnetic radiation is measured. This means that a temporal sequence of measurement values of the Time-of-Flight sensor is determined. In the illustrated exemplary embodiment, the sensor assembly 114 comprises an arrangement of photodiodes 113.

The evaluation unit 120 is connected to the sensor unit 110 and configured to determine a structure data set of the object 115 to be registered from the measured temporal progression of the radiation captured by the sensor assembly 114. In this context, the structure data set indicates a geometric structure of the object 115 to be registered, wherein the evaluation unit 120 in the present exemplary embodiment is configured to determine a 3-dimensional matrix as the structure data set.

The memory unit 130 is arranged spatially separate from the sensor unit 110, evaluation unit 120 and data-processing unit 140. The memory unit 130 has a wireless connection 135 to the data-processing unit 140. It is configured to store a number of association rules, each of which is associated with a situation parameter from a data set of predetermined situation parameters. In the present exemplary embodiment, the situation parameter is the current location of the sensor unit 110. In an exemplary embodiment that is not shown, the situation parameters are values that characterize a current day of the week, current weather data, a current location of the sensor unit and/or a current stop of a means of transport equipped with the registration system.

The registration system 100a in FIG. 1a is arranged in a bus, that is not shown for reasons of clarity. The situation parameter relating to the current location of the sensor unit 110 characterizes the last stop the bus has been to. The situation parameter relating to the current location is transmitted by an external device 160 to the registration system 140. In the present exemplary embodiment, the external device 160 is connected to the data-processing unit 140 via a wired connection.

The data-processing unit 140 is configured to access the structure data set and a current situation parameter as well as an association rule associated with the current situation parameter in the memory unit 130 and to associate the object from the structure data set with an object class on the basis of an association rule associated with the current situation parameter, wherein the object class indicates at least whether the object 115 to be registered is a person or not. In the present exemplary embodiment, the possible object classes include the object classes of adult, child, pet, bicycle, stroller, wheelchair, suitcase, walking aid. In an embodiment that is not shown, the object class merely distinguishes between person and non-person.

Furthermore, the data-processing unit 140 is configured to output counter information that characterizes the presence of an object of the determined object class. In the present case, the current situation parameter is, in addition, output along with the counter information. This enables the registration system according to the first exemplary embodiment to support the determination of an exact frequency distribution, which shows how many persons, strollers, bicycles and/or wheelchairs have boarded the bus at a respective bus stop over a specific period of time in the past. In addition, the registration system 100a of the illustrated exemplary embodiment is, by way of example, configured to output the counter information to a user interface 170. In the present exemplary embodiment, the user interface 170 is an output device with a display 174 that indicates the presence of an object of the determined object class to a user of the registration system 100a.

Figure 1B:
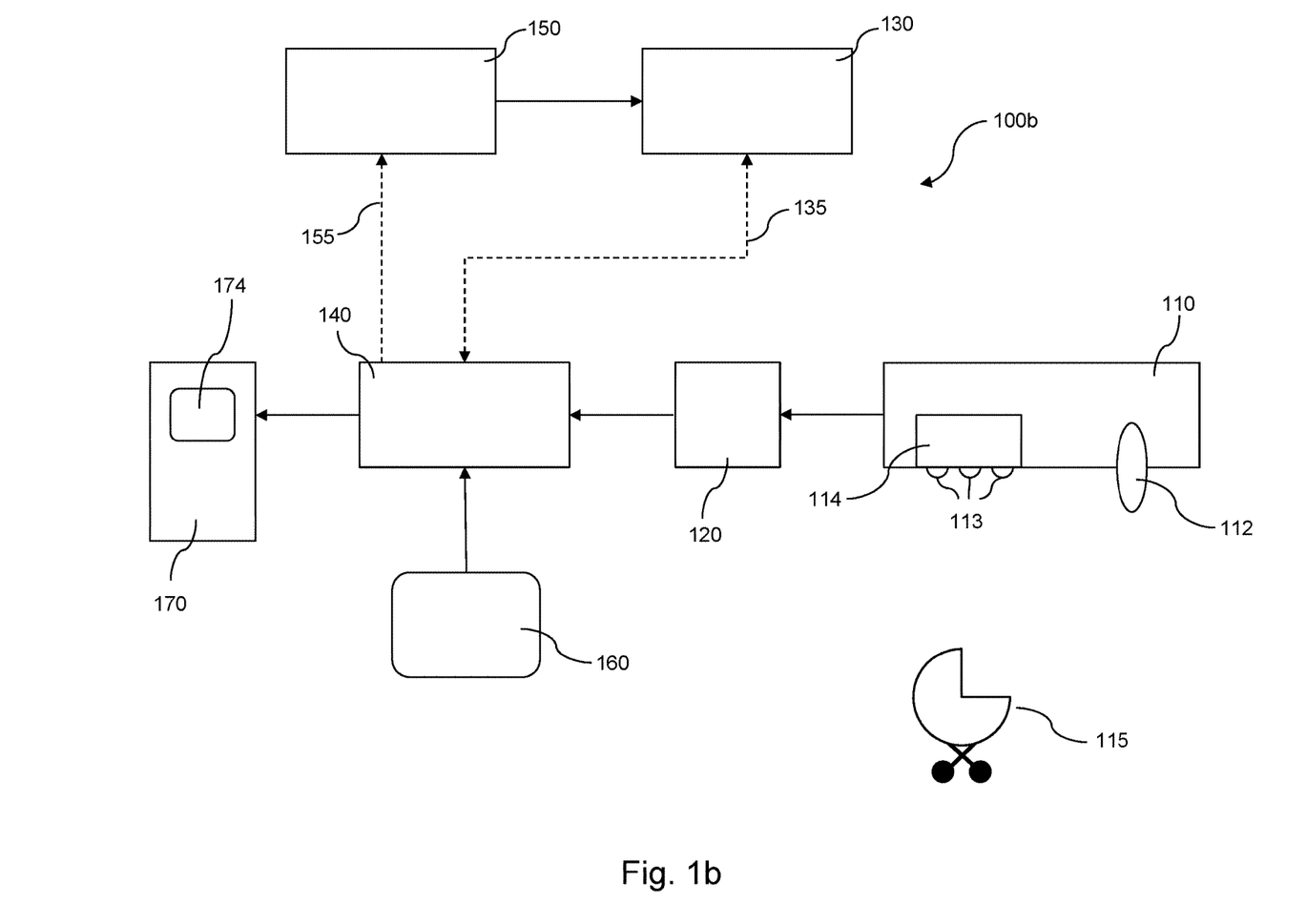

FIG. 1b shows a second exemplary embodiment of a registration system 100b. The second exemplary embodiment of the registration system 100b comprises the registration system 100a shown in FIG. 1a, wherein the registration system 100b comprises, in addition, an analysis unit 150.

The analysis unit 150 of the registration system 100b is connected to the data-processing unit 140 via a wireless connection 155 and to the memory unit 130 via a wired connection. it is configured to receive the current situation parameter and the counter information from the data-processing unit 140 and to trigger an adaptation of the association rule associated with the situation parameter in the memory unit 130 depending on the current situation parameter and the counter information.

By means of the registration system 100b according to the invention, the association rule for determining the object class is adapted in real time to the counter data contained in the counter information. The dependence of the association rule on the current situation parameter allows for a context-sensitive and therefore precise classification of objects.

In the illustrated exemplary embodiment, the association rule has a discrete probability distribution, that has been determined from the previous counter information for the current situation parameter, i.e. the previous number of objects of a respective object class. The specific result in the illustrated exemplary embodiment is a distribution for each stop of the bus, which shows how likely it is that an object 115 to be registered, that has boarded the bus, is a person, a pet, a bicycle, a stroller, a wheelchair, a suitcase or a walking aid. Taking into account this context knowledge, the data-processing unit 140 evaluates the structure data set. In this context, the data-processing unit 140 sends the current situation parameter to the memory unit 130 and, in return, receives the association rule associated with the current situation parameter from the memory unit 130. Data-processing units that determine an object class of the object to be registered on the basis of a structure data set are known to the skilled person, so that the specific functioning of the data-processing unit 140 is not addressed in the following. In one version of the illustrated exemplary embodiment, the result of such a known data-processing unit is adapted in accordance with the discrete probability distribution. In the following, this is explained on the basis of an example. The data-processing unit 140 determines from the structure data set that the probability that the object to be registered is a stroller is 30 percent. The registration system 100 will only associate an object class to an object to be registered, if the probability that the result is correct exceeds 50 percent. Since a kindergarten is located at the bus stop, in the past, the registration system 100 determined at this bus stop, i.e. for this situation parameter, the object class stroller particularly often. Therefore, the discrete probability distribution from the association rule shows a 2 percent probability that an object to be registered at this bus stop is a stroller. Since 2 percent is significantly more than the average value determined for the registration of a stroller of 0.4 percent, for the bus stop used in this example, a factor 2 is multiplied with the probability that the object to be registered is a stroller in the context of the association rule. The value of 0.4 percent determined on average is an object probability for the object stroller, wherein, proceeding on the basis of said value, the registration system has adapted the corresponding association rule in such a way that the value of 2 percent was determined for the bus stop location as the situation parameter. As a result, the data-processing unit will determine stroller as the object class due to the context knowledge obtained from previous determinations, despite the fact that the measurement was, for example due to interfering light sources, not clear.

In an exemplary embodiment that is not shown, an adaptation of the association rule associated with the situation parameter is realized via a neural network. In this context, the association rule is output implicitly. The neural network can, for example, access a structure data set and the current situation parameter and thus associate an object class with the object. In this sense, the registration system according to the invention does not require an explicit association rule, but can, in this exemplary embodiment, access an implicit association rule through the input of the structure data set and the output of object classes.

The sensor unit 110 in the illustrated exemplary embodiment captures in discrete timesteps of less than one second radiation and evaluates the corresponding data. In an exemplary embodiment that is not shown, capturing by the sensor unit is triggered by the output of a user signal. In this context, the user signal is for example the pressing of a key. In another exemplary embodiment that is not shown, the sensor unit comprises further a motion detector, that, as soon as it detects motion, triggers capturing by the sensor assembly of the sensor unit.

In an alternative embodiment that is not shown, the analysis unit and/or the memory unit are connected to the data-processing unit via a wired connection.

Figure 2:
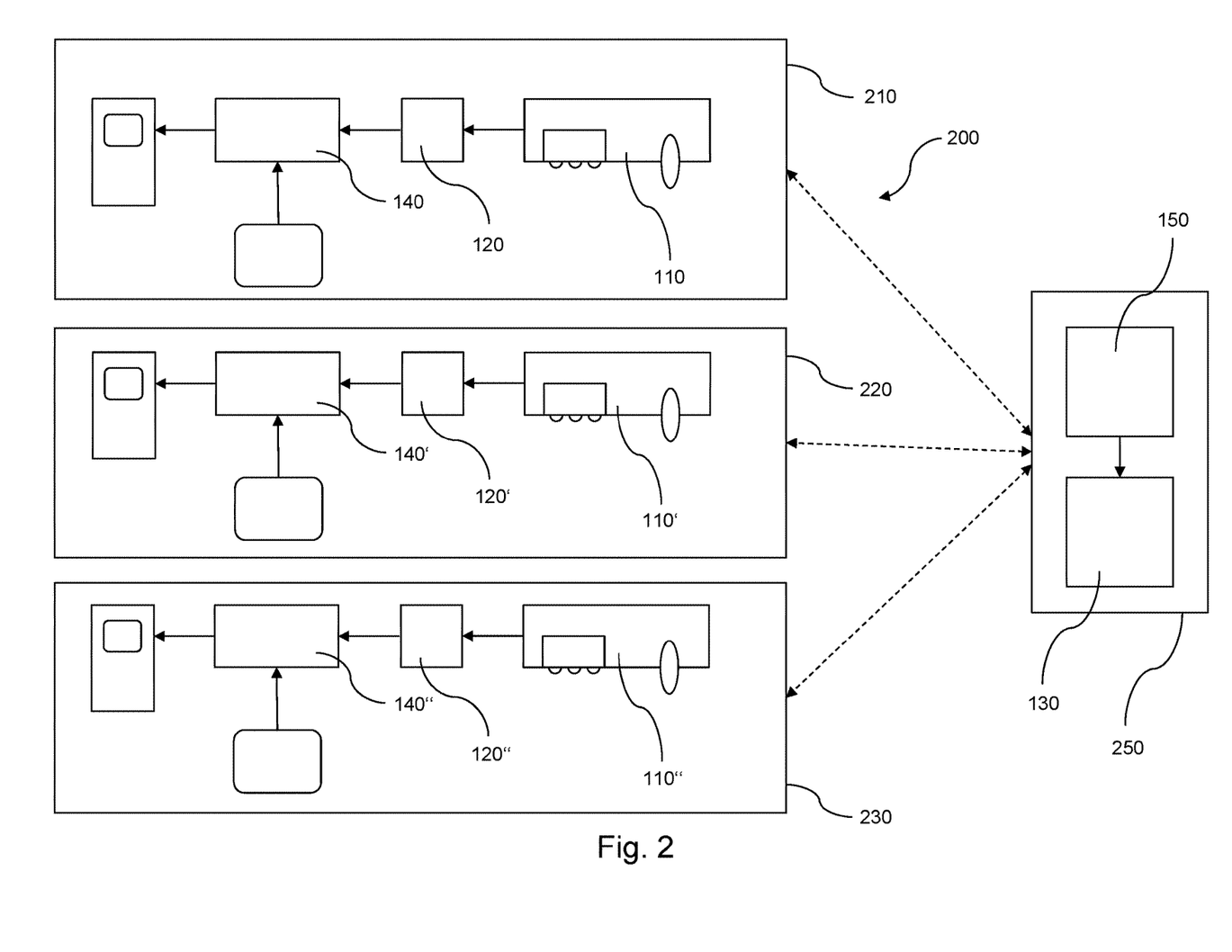
FIG. 2 a third exemplary embodiment of a registration system with a plurality of data-processing units according to the first aspect of the invention.

The registration system 100a, 100b shown in FIG. 1a and FIG. 1b is used for capturing objects on a bus. Alternatively, the registration system may also be used at stationary locations, such as the entrance to a building, a train station or an airport, or in other means of transport, such as a train, an airplane or a ship, wherein the selection of object classes to be distinguished is provided in accordance with typical objects to be registered. FIG. 2 shows a third exemplary embodiment of a registration system 200 with a plurality of data-processing units 140, 140', 140" according to the first aspect of the invention.

The data-processing system 200 is configured similarly to the data-processing system 100a, 100b shown in FIGS. 1a and 1b, wherein it comprises in addition two additional data-processing units 140', 140", sensor units 110', 110" and evaluation units 120', 120".

The data-processing system 200 according to the invention registers objects on three different buses 210, 220, 230, wherein the association rules stored in the memory unit 130 are adapted each time counter information has been received. The connection between the data-processing unit 140, 140', 140" and the memory unit 130 and/or analysis unit 150 is, in each case, a wireless connection. The fact that several buses 210, 220, 230 are used also means that more objects are registered, so that the situation parameter-dependent probabilities of the presence of certain object classes become more accurate.

In the exemplary embodiment shown in FIG. 2, the memory unit 130 and the analysis unit 150 are arranged in a shared stationary central module 250. In principle, the storage unit and the analysis unit in a registration system according to the invention may be available in a single module, for example within a computer-based system. The stationary central module 250 is a computer-based system which has an antenna arrangement for wireless communication via a GSM, WLAN, UMTS, DECT, LTE or NGMN network.

In an exemplary embodiment that is not shown, the memory unit 130 is further configured to output data indicating the counter information for each object class depending on the situation parameter to a central user output.

According to the registration system 200, the automatic classification of objects can, by means of an even larger registration system, be realized for a plurality of locations of the sensor unit, i.e. for example a plurality of means of public transport.

Figure 3:
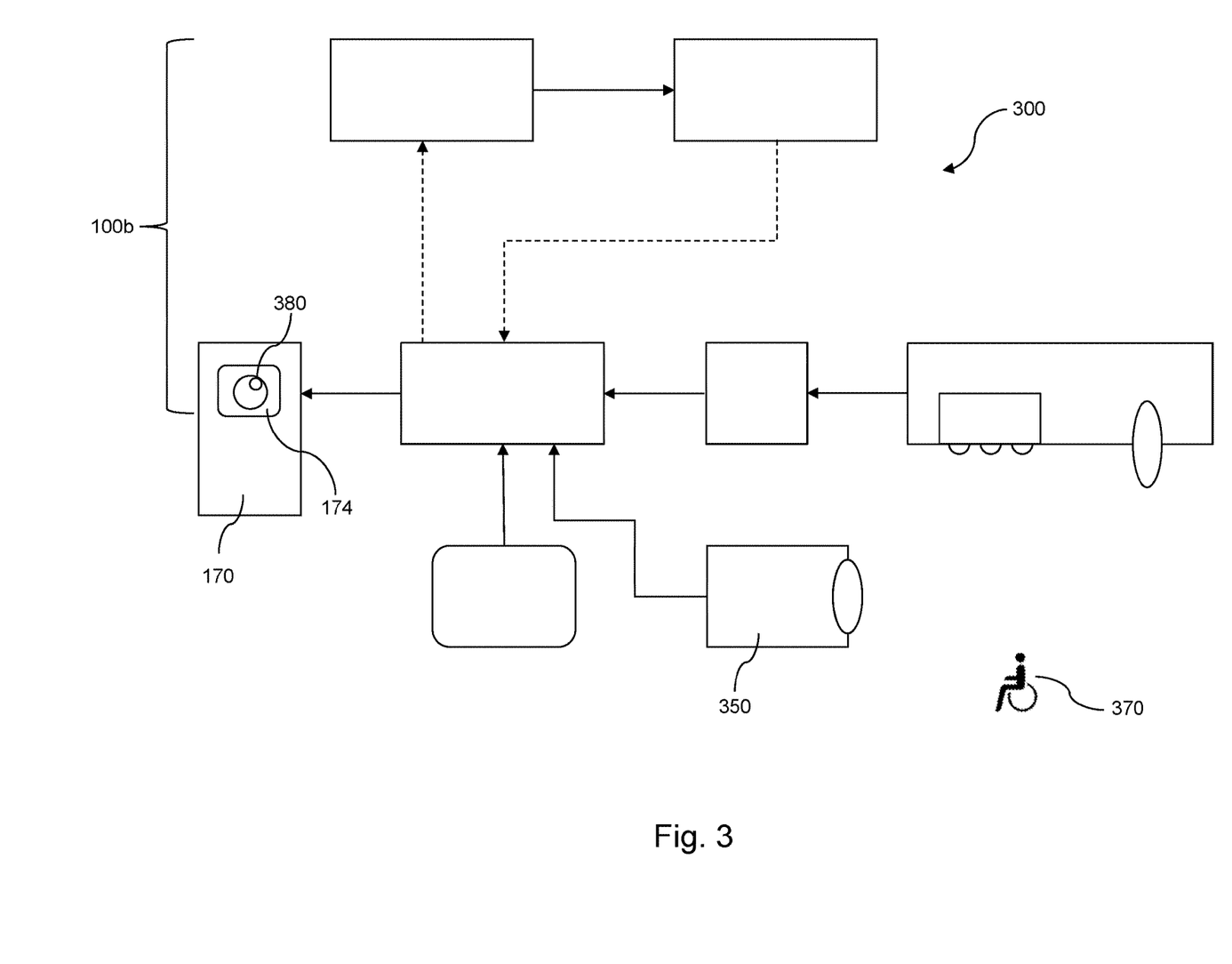
FIG. 3 an exemplary embodiment of an authorization check system according to a second aspect of the invention.

FIG. 3 shows an exemplary embodiment of an authorization check system 300 according to a second aspect of the invention.

The authorization check system 300 has the registration system 100b shown in FIG. 1b and a user input unit 350.

The user input unit 350 is configured to receive authorization information from a user 370 of the authorization check system 300. In the illustrated exemplary embodiment, the authorization information is received as an NFC, ZigBee, WLAN or Bluetooth signal. The signal is output by a portable electrical device of the person to be registered or the person accompanying an object to be registered. To this end, the user input unit 350 has a receiving device 355.

In an embodiment that is not shown, the user input unit is a stamping machine, a keyboard or an optical scanner.

Furthermore, the registration system 100b of the authorization check system 300 is configured to determine on the basis of a comparison between the received authorization information and the determined object class whether or not an authorization is available for an object 370 of the determined object class. If no authorization is available, the registration system 100b is further configured to trigger a warning signal 380.

In the illustrated exemplary embodiment, the warning signal 380 is output by the user interface 170 as an optical signal via the display 174.

Preferably, the user interface 170 will be available to a monitoring person, such as the driver of a means of public transport, in particular in order to check the authorization of rare objects that are being carried along.

In exemplary embodiments that are not shown, the warning signal is an acoustic or an electrical signal.

Figure 4A:
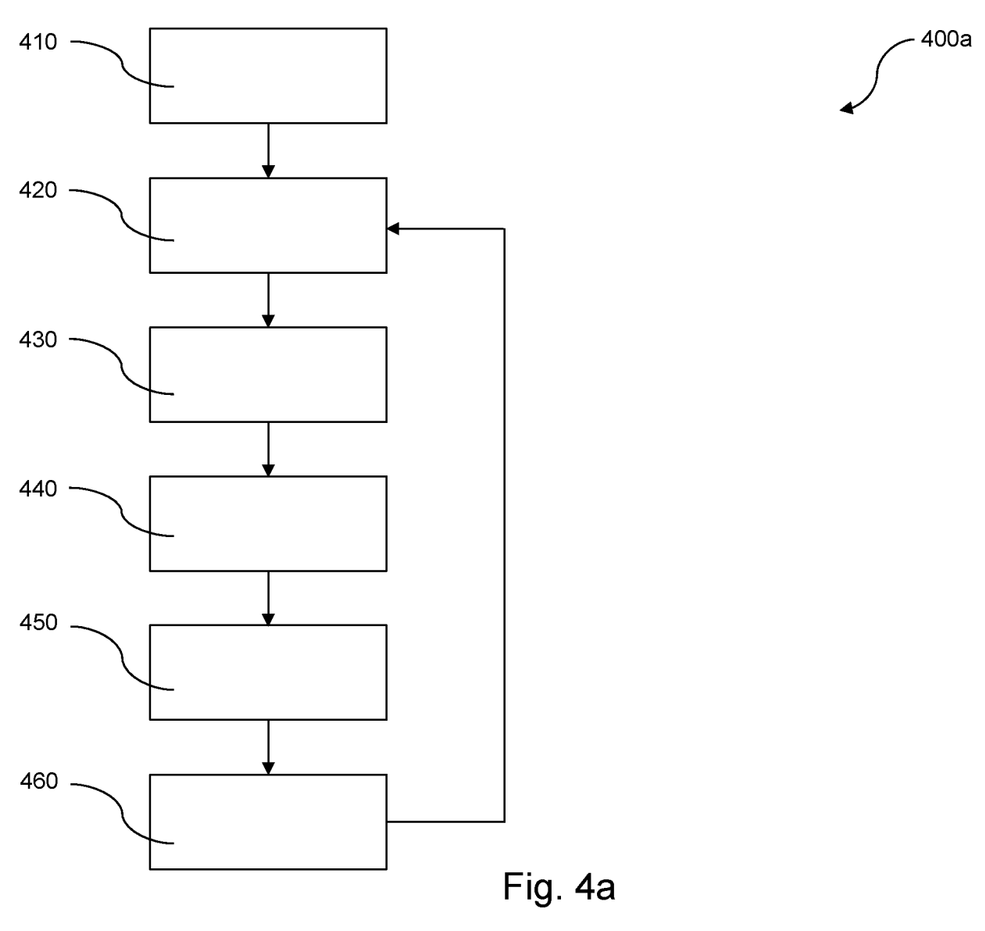
FIG. 4a, b a first exemplary embodiment (FIG. 4a) and a second exemplary embodiment (FIG. 4b) of a method of operating a registration system according to a third aspect of the invention.

FIG. 4a shows a first exemplary embodiment of a method 400a of operating a registration system according to a third aspect of the invention.

In accordance with the invention, the method comprises the steps described below.

A first step 410 comprises the storing of a number of association rules, each of which is associated with a situation parameter from a set of predetermined situation parameters.

In a further step 420, electromagnetic radiation is emitted.

Subsequently, radiation reflected by an object is captured in a next step 430.

In a further step 440, a structure data set is determined from a temporal progression of the captured radiation.

In a next step 450 of the method according to the invention, the structure data set and a current situation parameter are accessed, and an object class is determined from the structure data set, on the basis of an association rule associated with the current situation parameter.

Subsequently, in another step 460, counter information indicating the presence of an object of the determined object class is output.

For the registration of a further object and the determination of the corresponding further object class, the method according to the invention is repeated from step 420, so that the steps 420, 430, 440, 450, 460 are once again performed in that order.

Figure 4B:
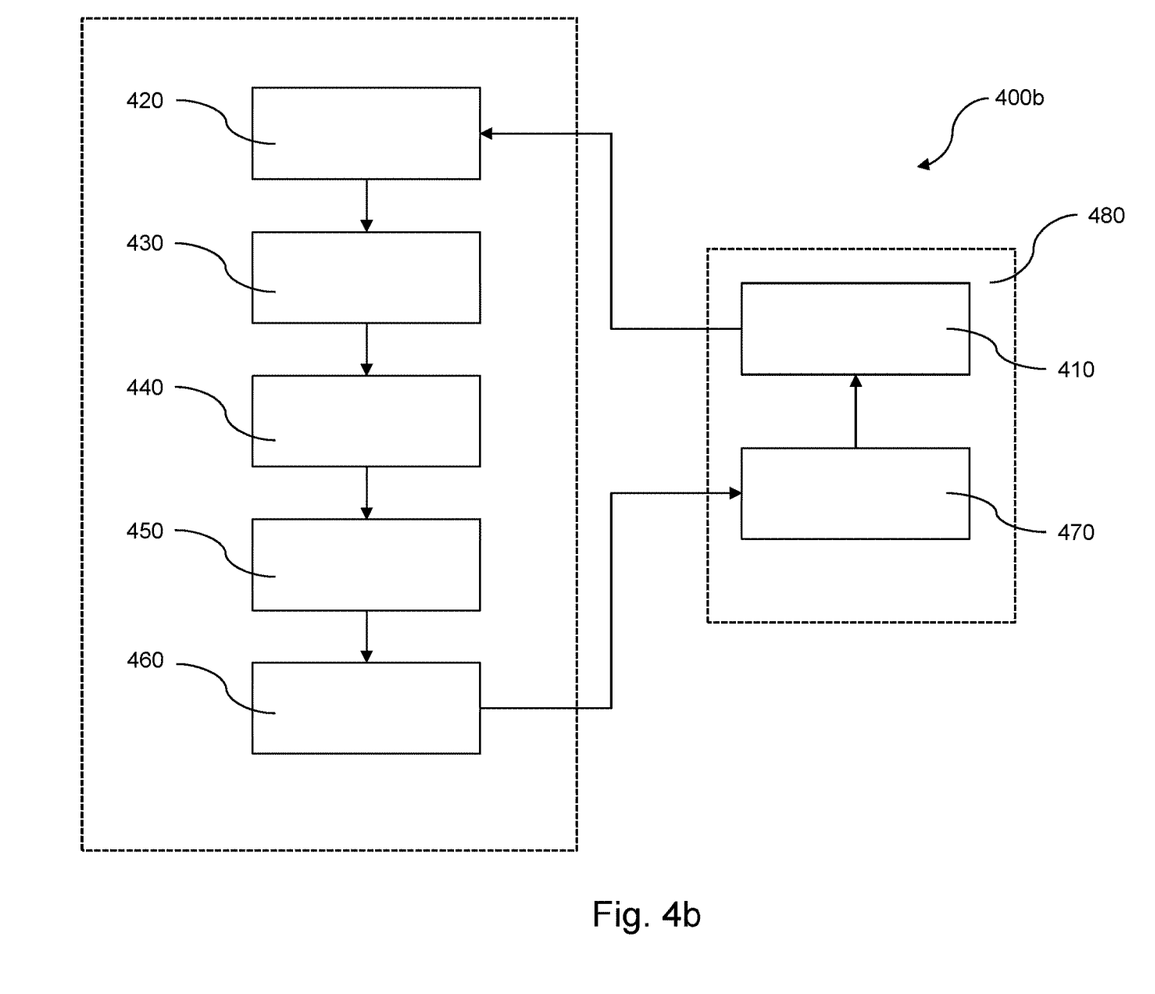

A second exemplary embodiment of the method 400b according to the invention shown in FIG. 4b also comprises the method steps 410, 420, 430, 440, 450, 460 shown in FIG. 4a. Furthermore, the method shown in FIG. 4b shows the additional method step 470. This step comprises the adaptation of the stored association rule associated with the situation parameter, depending on the counter information and the current situation parameter.

In the illustrated exemplary embodiment, the method steps of storing the number of association rules 410 and of adapting the stored association rules 470 are performed at a first location 480 and the other method steps are performed at a second location 490.

Once the association rule has been adapted and stored, it will typically be used for the classification of another object so that the method 400b according to the invention is performed repeatedly for each object to be registered.

LIST OF REFERENCE NUMBERS

100a, 100b, 200 registration system
110, 110', 110" sensor unit
112 radiation source
114 sensor assembly 115 object
120, 120', 120" evaluation unit
130 memory unit
135 wireless connection between the memory unit and the data-processing unit
140, 140',140" data-processing unit
150 analysis unit
155 wireless connection between the analysis unit and data-processing unit
160 external device
170 user interface
174 display
210, 220, 230 bus
250 stationary central module
300 authorization check system
350 user input device
355 receiving device
370 user
380 warning signal
400a, 400b method
410, 420, 430, 440 method steps
450, 460, 470
480 first location
490 second location

What is claimed is:

1. A registration system for classifying an object, comprising:
   a sensor unit with a radiation source for emitting electromagnetic radiation and a sensor assembly for capturing radiation reflected by the object;
   an evaluation unit that is connected to the sensor unit and configured to determine a temporal sequence of structure data sets of the object to be registered from the radiation captured by the sensor assembly;
   a memory unit that is configured to store a number of different association rules for associating an object with an object class, each of the association rules is associated with a set of predetermined situation parameters; said situation parameters reflecting varying situations of the registration system, including any of the following:
   location, weather, and daytime,
      wherein due to the respective association with a situation parameter, the association rules are defined differently for different situations of the registration system, and
   a data-processing unit that is connected to the memory unit and configured:
      to access the structure data set and a current situation parameter as well as at least one association rule associated with the current situation parameter, wherein the current situation parameter only characterizes a current situation of the registration system, and
      to associate the object with an object class on the basis of the structure data sets using an association rule associated with the current situation parameter set characterizing the current situation of the registration system,
   wherein the object class is selected from a group of object classes which allow at least the distinction of whether the object is a person or not, and
   wherein the data-processing unit may be further configured to output counter information that indicates that the registration system has registered an object of the determined class.

2. The registration system according to claim 1, wherein the memory unit and/or analysis unit are connected to the data-processing unit via a wireless connection.

3. The registration system according to claim 2, that comprises at least one further data-processing unit and where the memory unit and/or the analysis unit are configured such that they also have a wireless connection to the at least one additional data-processing unit of the registration system.

4. The registration system according to claim 1, wherein the analysis unit and/or the memory unit are connected to the data-processing unit via a wired connection.

5. The registration system according to claim 1, wherein the group of object classes comprises several object classes, namely, a combination of the object classes of person, pet, bicycle, stroller, wheelchair, suitcase or walking aid.

6. The registration system according to claim 1, wherein the situation parameters are values that characterize a current day of the week, a current season, a current time, current weather data, holidays, vacation, use of boarding ramps, a current location of the sensor unit, a current stop of a means of transport equipped with the registration system, a one-sided lowering of the means of transport and/or entry information.

7. The registration system according to claim 1, wherein the data-processing unit is further configured to receive the current situation parameter from an external device.

8. The registration system according to claim 1, wherein the structure data set for a respective point in time represents a point cloud.

9. The registration system according to claim 1, wherein the data processing unit is configured to evaluate successive structure data sets over time such that the data-processing unit is able to capture and to track the movement of one or several objects represented by the structure data sets.

10. The registration system according to claim 1, wherein the data processing unit is further configured to output the counter information to a user interface, so that the presence of an object of the determined object class is shown to a user of the registration system.

11. The registration system according to claim 1, wherein the registration system is configured to be arranged in a means of transport, wherein the objects to be registered are transported by the means of transport.

12. The registration system for classifying an object, comprising:
   a sensor unit with a radiation source for emitting electromagnetic radiation and a sensor assembly for capturing radiation reflected by the object;
   an evaluation unit that is connected to the sensor unit and configured to determine a temporal sequence of structure data sets of the object to be registered from the radiation captured by the sensor assembly;
   a memory unit that is configured to store a number of different association rules for associating an object with an object class, each of the association rules is associated with a set of predetermined situation parameters; said situation parameters reflecting varying situations of the registration system, including any of the following:
   location, weather, and daytime
      wherein due to the respective association with a situation parameter, the association rules are defined differently for different situations of the registration system, and
   a data-processing unit that is connected to the memory unit and configured:

to access the structure data set and a current situation parameter as well as at least one association rule associated with the current situation parameter, wherein the current situation parameter only characterizes a current situation of the registration system, and to associate the object with an object class on the basis of the structure data sets using an association rule associated with the current situation parameter set characterizing the current situation of the registration system, wherein the object class is selected from a group of object classes which allow at least the distinction of whether the object is a person or not, and wherein the data-processing unit may be further configured to output counter information that indicates that the registration system has registered an object of the determined class, wherein the registration system further comprises an analysis unit that is connected to the data-processing unit and the memory unit and configured to access the current situation parameter and the counter information and to trigger an adaptation of the association rule associated with the situation parameter set in the memory unit depending on the current situation parameter set and the counter information.

13. An authorization check system comprising a registration system according to claim 1 and a user input unit that is configured to receive authorization information from a user of the authorization check system, wherein the registration system is further configured to determine based on a comparison between the received authorization information and the determined object class whether or not an authorization is avail-able for an object of the determined object class, and to trigger a warning signal if no authorization is available.

14. A method of operating a registration system, comprising the steps of:

storing a number of different initial association rules for associating an object with an object class, each of the association rules is associated with a situation parameter set comprising situation parameters that reflect varying situations of the registration system such as location, weather or daytime, wherein due to the respective association with a situation parameter, the association rules are defined differently for different situations of the registration system;

emitting electromagnetic radiation;

capturing radiation reflected by an object;

determining a structure data set from a temporal progression of the captured radiation;

accessing the structure data set or a temporal sequence of structure data sets and a current situation parameter, wherein the current situation parameter only characterizes a current situation of the registration system, as well as the association rule associated with the current situation parameter set, characterizing the current situation of the registration system and determining an object class from the structure data set and/or the temporal sequence of structure data sets on the basis of the association rule associated with the current situation parameter set, wherein the object class is selected from a group of object classes that allows at least the distinction of whether the object is a person or not; and outputting counter information that indicates the presence of an object of the deter-mined object class.

15. A method of operating a registration system, comprising the steps of:

storing a number of different initial association rules for associating an object with an object class, each of which the association rules is associated with a situation parameter set comprising situation parameters that reflect varying situations of the registration system such as location, weather or daytime, wherein due to the respective association with a situation parameter, the association rules are defined differently for different situations of the registration system;

emitting electromagnetic radiation;

capturing radiation reflected by an object;

determining a structure data set from a temporal progression of the captured radiation;

accessing the structure data set or a temporal sequence of structure data sets and a current situation parameter, wherein the current situation parameter only characterizes a current situation of the registration system, as well as the association rule associated with the current situation parameter set, characterizing the current situation of the registration system and determining an object class from the structure data set and/or the temporal sequence of structure data sets on the basis of the association rule associated with the current situation parameter set, wherein the object class is selected from a group of object classes that allows at least the distinction of whether the object is a person or not;

outputting counter information that indicates the presence of an object of the deter-mined object class, wherein an additional last step comprises an adaptation of the stored association rule associated with the situation parameter set, depending on the counter information and the current situation parameter acquired during operation of the registration system.

16. The method according to claim 15, wherein the steps of storing the number of association rules and of adapting the stored association rule are performed spatially separately from the other steps of the method, and wherein the association rule associated with the current situation parameter set is accessed wirelessly for the determination of the object class.

* * * * *